(12) United States Patent
Claycomb et al.

(10) Patent No.: US 11,054,266 B2
(45) Date of Patent: Jul. 6, 2021

(54) CONFIDENTIAL ROUTE MONITORING WITH TRAVELER-CONFIGURED TRAVELER SAFETY ALERTS

(71) Applicant: International Business Machines Corporation, Armonk, NY (US)

(72) Inventors: Matthew R. Claycomb, Austin, TX (US); Trenton J. Johnson, Raleigh, NC (US); James L. Lentz, Austin, TX (US); Dana L. Price, Surf City, NC (US); Charmant K. Tan, San Jose, CA (US); Ramratan Vennam, Colfax, NC (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 14/592,792

(22) Filed: Jan. 8, 2015

(65) Prior Publication Data
US 2016/0202073 A1 Jul. 14, 2016

(51) Int. Cl.
*G01C 21/34* (2006.01)
*H04W 4/029* (2018.01)
*G08B 25/01* (2006.01)

(52) U.S. Cl.
CPC .......... *G01C 21/34* (2013.01); *G08B 25/016* (2013.01); *H04W 4/029* (2018.02)

(58) Field of Classification Search
CPC .................................................. G01C 21/34
See application file for complete search history.

(56) References Cited

U.S. PATENT DOCUMENTS

| 6,208,934 B1 | 3/2001 | Bechtolsheim et al. |
| 6,691,029 B2 | 2/2004 | Hughes et al. |
| 6,885,874 B2 | 4/2005 | Grube et al. |
| 7,336,942 B2 | 2/2008 | Wang |
| 7,443,298 B2 | 10/2008 | Cole et al. |
| 8,145,183 B2 | 3/2012 | Barbeau et al. |

(Continued)

OTHER PUBLICATIONS

Author Unknown, S-911 LolaTM Student Locator for Colleges and Universities, Adiant Solutions Product Description, 2014, pp. 1-2, Adiant Solutions AUS, Perth, Australia.

(Continued)

*Primary Examiner* — Imran K Mustafa
(74) *Attorney, Agent, or Firm* — Yee & Associates, P.C.

(57) ABSTRACT

A user's travel is securely monitored using user-configured secure travel monitoring constraints within a secure travel profile. The user-configured secure travel monitoring constraints granularly specify controls related to user travel privacy and authorized release of travel information to a user-specified trusted third party in association with the user's travel, in addition to specifying a planned travel route and a planned travel time frame. A route deviation by the user relative to the planned travel route or planned travel time frame is detected during the secure monitoring of the user's travel. A user-configured level of travel information authorized by the user to be released to the user-specified trusted third party within a traveler safety alert responsive to the route deviation is determined based upon the user-configured secure travel monitoring constraints. The traveler safety alert with the user-configured level of travel information is sent to the user-specified trusted third party.

20 Claims, 4 Drawing Sheets

(56) References Cited

U.S. PATENT DOCUMENTS

| | | | |
|---|---|---|---|
| 2005/0075116 A1* | 4/2005 | Laird | A61B 5/04 455/456.3 |
| 2005/0114014 A1 | 5/2005 | Isaac | |
| 2009/0005080 A1 | 1/2009 | Forstall et al. | |
| 2009/0177387 A1 | 7/2009 | Liu | |
| 2009/0276154 A1* | 11/2009 | Subramanian | G01C 21/20 701/469 |
| 2010/0299060 A1* | 11/2010 | Snavely | G06Q 10/02 701/533 |
| 2013/0096819 A1* | 4/2013 | Tarnok | G01C 21/00 701/428 |
| 2014/0171013 A1* | 6/2014 | Varoglu | H04W 4/22 455/404.2 |
| 2014/0221016 A1* | 8/2014 | Lee | G08B 21/0269 455/456.3 |
| 2015/0160014 A1* | 6/2015 | Hewitt | G01C 21/20 701/522 |

OTHER PUBLICATIONS

Sara Howland, The Economic Advantages of Fleet Management, Integrated Solutions Magazine, Jan./Feb. 2009, pp. 1-4, Integrated Solutions, Published online at: http://www.telogis.com/assets/Documents/namasco-integrated-solutions-cover-story.pdf.

Aaron Huff, Tracking out of route, CCJ Magazine, Dec. 8, 2008, pp. 1-3, Randall Publications, Retrieved via archived website at: http://web.archive.org/web/20081208133711/http://www.randallpub.com/ccj/ccjinnovators/technology_6.htm.

Charles Mendis, Locate your friends in real time with Google Latitude, Google Mobile Blog, Feb. 4, 2009, pp. 1-16, Google Inc., Published online at: http://googlemobile.blogspot.com/2009/02/locate-your-friends-in-real-time-with.html.

K. Takata, et al., A Dangerous Location Aware System for Assisting Kids Safety Care, Proceedings of the 20th International Conference on Advanced Information Networking and Applications, Apr. 18-20, 2006, pp. 657-662 (Abstract only), IEEE Society, Vienna, Austria.

Author Unknown, Let the kids experience the world on their own-and feel completely safe, Trax Application Product Information, Printed from website on or about Dec. 19, 2014, pp. 1-8, WTS-Wonder Technology Solutions, Published online at: http://www.traxfamily.com/gps-tracker-for-children.html.

Dana Villamagna, Gone Out—Later Folks, Product Review, 2014, pp. 1-4, Common Sense Media, Inc., Published online at: https://www.commonsensemedia.org/app-reviews/gone-out-later-folks.

* cited by examiner

FIG. 4 ively and configurable travel safety monitoring and alerting to trusted third party.

CONFIDENTIAL ROUTE MONITORING WITH TRAVELER-CONFIGURED TRAVELER SAFETY ALERTS

BACKGROUND

The present invention relates to travel safety. More particularly, the present invention relates to confidential route monitoring with traveler-configured traveler safety alerts.

People routinely travel from place to place during a course of an average day. Manners of travel may include travel by use of public transportation, private vehicles, bicycles, and by walking.

BRIEF SUMMARY

A method includes securely monitoring, by a processor, a user's travel using user-configured secure travel monitoring constraints within a secure travel profile, where the user-configured secure travel monitoring constraints granularly specify controls related to user travel privacy and authorized release of travel information to a user-specified trusted third party in association with the user's travel, in addition to specifying a planned travel route and a planned travel time frame; detecting, during the secure monitoring of the user's travel, a route deviation by the user relative to one of the planned travel route and the planned travel time frame specified within the user-configured secure travel monitoring constraints; determining, based upon the user-configured secure travel monitoring constraints, a user-configured level of travel information authorized by the user to be released to the user-specified trusted third party within a traveler safety alert responsive to the route deviation; and sending, to the user-specified trusted third party, the traveler safety alert with the user-configured level of travel information.

A system includes a memory; and a processor programmed to: securely monitor a user's travel using user-configured secure travel monitoring constraints within a secure travel profile stored within the memory, where the user-configured secure travel monitoring constraints granularly specify controls related to user travel privacy and authorized release of travel information to a user-specified trusted third party in association with the user's travel, in addition to specifying a planned travel route and a planned travel time frame; detect, during the secure monitoring of the user's travel, a route deviation by the user relative to one of the planned travel route and the planned travel time frame specified within the user-configured secure travel monitoring constraints; determine, based upon the user-configured secure travel monitoring constraints, a user-configured level of travel information authorized by the user to be released to the user-specified trusted third party within a traveler safety alert responsive to the route deviation; and send, to the user-specified trusted third party, the traveler safety alert with the user-configured level of travel information.

A computer program product includes a computer readable storage medium having computer readable program code embodied therewith, where the computer readable program code when executed on a computer causes the computer to: securely monitor a user's travel using user-configured secure travel monitoring constraints within a secure travel profile, where the user-configured secure travel monitoring constraints granularly specify controls related to user travel privacy and authorized release of travel information to a user-specified trusted third party in association with the user's travel, in addition to specifying a planned travel route and a planned travel time frame; detect, during the secure monitoring of the user's travel, a route deviation by the user relative to one of the planned travel route and the planned travel time frame specified within the user-configured secure travel monitoring constraints; determine, based upon the user-configured secure travel monitoring constraints, a user-configured level of travel information authorized by the user to be released to the user-specified trusted third party within a traveler safety alert responsive to the route deviation; and send, to the user-specified trusted third party, the traveler safety alert with the user-configured level of travel information.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides confidential route monitoring with traveler-configured traveler safety alerts. The present technology provides for a user's travel to be securely monitored using user-configured secure travel monitoring constraints within a secure travel profile. In addition to a planned travel route with a planned travel time, the user-configured secure travel monitoring constraints may granularly specify controls related to user travel privacy and authorized release of travel information to a user-specified trusted third party in association with the user's travel. Responsive to detecting a route deviation by the user relative to one of the planned travel route and the planned travel time specified by the user within the user-configured secure travel monitoring constraints, a user-configured level of travel information may be determined and released within a traveler safety alert to the user-specified trusted third party. The user-configured level of travel information may also be configured by the user within the user-configured secure travel monitoring constraints. The traveler safety alert, including the user-configured level of travel information within the user-configured secure travel monitoring constraints, may be sent to the user-specified trusted third party.

The present technology solves a recognized travel safety problem by providing technology that includes a new form of a secure travel safety computing system that performs secure confidential user-requested monitoring of a user's travel and that sends traveler safety alerts/notifications to user-specified trusted third parties, such as law enforcement, campus security, spouses, significant others, parents, coaches, scout leaders, or any other third party that is configured as an authorized third-party by the traveling user, in response to detected traveler safety events (e.g., route deviations in one or more of time, location, etc.). Because the user's travel is monitored in a secure and confidential manner, the user's travel plans and travel route are not disclosed to the trusted third party unless such disclosure is specifically authorized by the user by user-configured secure travel monitoring constraints within a secure travel profile. As such, the trusted third party does not monitor the user's travel or track the user, and the trusted third party does not know the user's travel plans or travel route, again unless specifically configured by the traveling user. However, where it is determined that the user has physically deviated unexpectedly from a planned travel route or has been unexpectedly delayed along the travel route (e.g., a time or location deviation), the trusted third party may be notified that the user may have encountered a problem at a particular location, again without disclosure of the travel route unless specifically configured by the user. A physical route deviation and a time deviation along a travel route are both considered "route deviations" for purposes of the present description. The travel route may further be removed from the secure travel safety computing system (e.g., unsubscribed) upon the user's arrival at their destination to further protect the user's privacy.

The present technology may be utilized by college students in and around college campuses, by daily commuters, hikers, mountain climbers, sailors and other boaters, and by any vacationers traveling within a country and abroad. Any person that travels along a route may benefit from the secure travel safety enhancements provided by use of the present technology.

A technical feature of the present technology is that a user that is knowingly performing a route deviation along a travel route may securely update their secure travel profile, including their expected arrival times and routes, monitoring configuration, and configured trusted third party to receive traveler safety alerts at any time and in real time during travel. However, another technical feature is that someone without secured access to the secure travel safety computing system (e.g., a person that may have intent to cause the traveler harm) will not be aware of or capable of changing the user's configured travel profile, including the configured traveler safety alerts to the trusted third party/parties (hereinafter "trusted third party" for brevity). As such, if an unexplained route deviation occurs, the last-configured trusted third party may be alerted with both the user's current location and with the possibility that the user has encountered a problem. Further, someone without secured access (e.g., again a person that may have intent to cause the traveler harm) will not have a capability to stop the traveler safety alert once the established conditions for generation of the traveler safety alert are detected. Accordingly, the present technology may assist the user with travel safety alerts in situations where the traveler is unable to dial an emergency contact number (e.g., 911) or is unable to respond to questions asked by emergency management personnel.

While the threshold implementation provides fully secured travel confidentiality, the present technology may additionally provide a user with dynamic control over opting in and opting out of the secured monitoring. Because the secure travel safety computing system tracks the user along a path, the user may additionally control whether or not the configured trusted third party is provided with the traveler's travel path and position along the path, either before or during the time of travel, or in response to or in association with generation of a travel safety alert to the trusted third party.

Additionally, the user may dynamically control sharing of travel information, such as time to position on a path, points at which the user is delayed, and deviation from the path using user-configured secure travel monitoring constraints within the secure travel profile. The user-configured secure travel monitoring constraints control both monitoring and third-party notification aspects of secure travel monitoring. Information related to the path may be configured to be held in "escrow" within the secure travel safety computing system, such that the system issues an alert only if certain secondary information with respect to traversing the path exceeds a threshold. For example, the user may give permission for the secure travel safety computing system to alert the configured trusted third party if, and only if, the user's position deviates from the travel path by a certain path-deviation threshold amount (e.g., percentage, distance, etc.). By use of the path-deviation threshold, the configured trusted third party may be provided with access to the travel path itself only if this path-deviation threshold is exceeded. Alternatively, the user may configure granular control of sharing of their secure travel profile so that, for example, the configured trusted third party does not have access to the travel path information, and only the position of the user when the user deviates from the travel path is provided to the trusted third party.

Other configuration settings and metrics may be employed to protect privacy while enhancing security. For example, traveler safety alerts may be issued if the user is detained for a certain amount of time along the travel path (e.g., involved in an accident, delayed by an unplanned person, etc.). By keeping the travel path information itself private, users may travel with confidence that they are not under surveillance and are not sacrificing privacy. Release of travel path information may be performed at a granular and configurable level (e.g., limited information up to full information), and release of the configured level of travel path information may be performed only under circumstances of the user's choosing and configuration, such as when the traveler may be personally at risk of harm. The user may have control over the exact nature of the information and the conditions under which that information may be disclosed to the configured trusted third party. The user may make changes to these configuration settings and metrics before, during or after traversing a path. Again, a person that may be attempting to cause harm to the traveler would not have access to information usable to change the configuration settings and metrics, which further aids in the protection of the traveler.

As such, the present technology allows elective traveler participation in a confidential manner. Further, the present technology may allow user-customized travel routes to be submitted to the secure travel safety computing system, may allow notification to a trusted third party in response to determining that the traveler has deviated unexpectedly along a travel route, and may allow confidential removal of user/route information when the user either elects to remove the information or safely reaches the desired destination, each under user control and as configured by the user. Accordingly, the present technology may empower the user to control their own travel safety settings within a secure computing platform that securely monitors the user's travel, compares the user's travel with a planned travel configuration (e.g., route, time, etc.), and generates traveler safety alerts with a granular level of user-configured information to trusted third parties.

It should be noted that conception of the present subject matter resulted from recognition of certain limitations associated with travel. For example, it was observed that prior technologies allow users to request suggested travel routes between a starting location and a destination, and to even share their suggested travel routes with friends and family. However, it was determined that there was no prior technology by which a user may securely and confidentially have their own travel monitored for travel safety purposes. It was additionally determined that there was no prior technology that provided a travel alert if a user encountered a problem within the context of secure and confidential monitoring for travel safety. The present subject matter improves travel safety by providing for confidential route monitoring with traveler-configured traveler safety alerts, as described above and in more detail below. As such, improved travel safety may be obtained through use of the present technology.

The confidential route monitoring with traveler-configured traveler safety alerts described herein may be performed in real time to allow prompt configuration, reconfiguration, and removal of securely monitored travel routes with third-party alerts. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
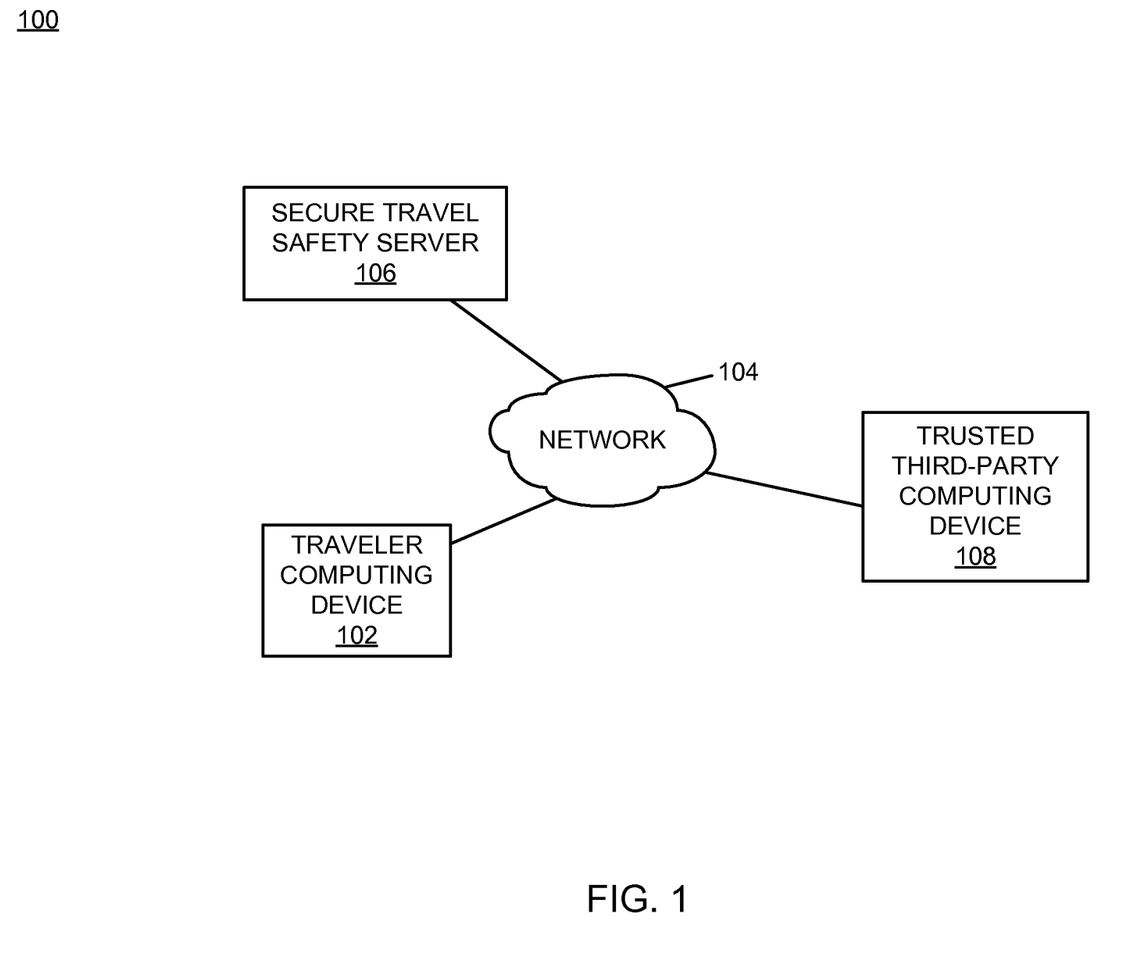
FIG. 1 is a block diagram of an example of an implementation of a system for confidential route monitoring with traveler-configured traveler safety alerts according to an embodiment of the present subject matter.

FIG. 1 is a block diagram of an example of an implementation of a system 100 for confidential route monitoring with traveler-configured traveler safety alerts. A traveler computing device 102 communicates via a network 104 with a secure travel safety server 106. The traveler computing device 102 represents a new form of mobile device that provides secure travel safety coordination with the secure travel safety server 106. The secure travel safety server 106 represents a new secure travel safety platform that interacts with the traveler computing device 102. Either the traveler computing device 102 or the secure travel safety server 106 may operate to perform the secure monitoring of a configured travel plan of a user of the traveler computing device 102 based upon traveler-configured travel route and travel times. Either device may detect route deviations of the traveler along the travel route relative to the configured travel plans, and generate the traveler-configured traveler safety alerts to a trusted third party.

A trusted third-party computing device 108 is also represented within the system 100 of FIG. 1. It should be noted that the trusted third-party computing device 108 represents one of many possible devices used by a trusted third-party to receive the generated traveler safety alerts and to provide the traveler safety alerts to the trusted third party. For example, the trusted third-party computing device 108 may be a centralized law enforcement emergency operations server that receives emergency communications (e.g., 911 telephone calls, text messages, emails, etc.), a handheld device utilized by a law enforcement or campus security officer, or other trusted third party.

The secure travel safety server 106 may generate the traveler safety alerts in any manner appropriate for the configured trusted third-party server 108, such as, for example, the formats noted above. The secure travel safety server 106 may utilize recorded or generated voice messages where the trusted third-party server 108 is an emergency call center, or may generate text content for text messages or emails, or other form of text-based messaging.

As will be described in more detail below in association with FIG. 2 through FIG. 4, the traveler computing device 102 and the secure travel safety server 106 may each provide automated confidential route monitoring with traveler-configured traveler safety alerts. For example, the traveler computing device 102 may implement the secure travel monitoring, and may engage the services of the secure travel safety server 106 for generation of the traveler safety alert to the trusted third-party server 108, or may generate the traveler safety alert directly to the trusted third-party server 108. Alternatively, the secure travel safety server 106 may perform the secure travel monitoring, as appropriate for a given implementation. As such, the present technology may be implemented at a user computing device or server device level, or by a combination of such devices as appropriate for a given implementation. A variety of possibilities exist for implementation of the present subject matter, and all such possibilities are considered within the scope of the present subject matter.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
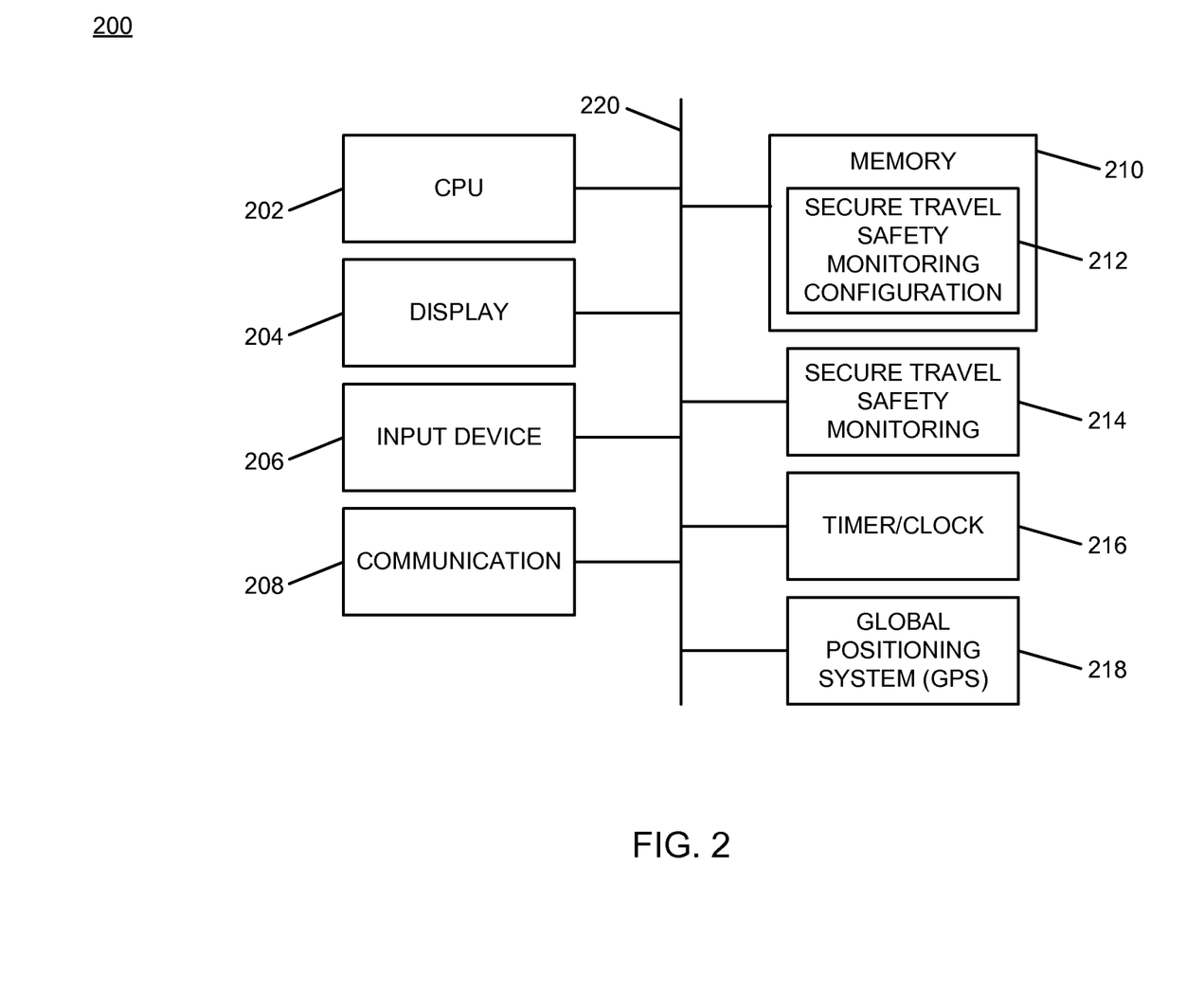
FIG. 2 is a block diagram of an example of an implementation of a core processing module capable of performing confidential route monitoring with traveler-configured traveler safety alerts according to an embodiment of the present subject matter.

FIG. 2 is a block diagram of an example of an implementation of a core processing module 200 capable of performing confidential route monitoring with traveler-configured traveler safety alerts. The core processing module 200 may be associated with each of the traveler computing device 102, the secure travel safety server 106, and with the trusted third-party server 108, with different configurations of components as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of secure travel safety monitoring and traveler safety alerts in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a secure travel safety monitoring configuration storage area 212 that stores configured travel routes, travel times, trusted third party identifiers, traveler safety alert protocols and message templates, and other travel safety configuration information within the core processing module 200. It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A secure travel safety monitoring module 214 is also illustrated. The secure travel safety monitoring module 214 provides travel safety configuration, secure travel safety monitoring, and traveler safety alert generation or receipt (as appropriate for the given implementation) for the core processing module 200, as described above and in more detail below. The secure travel safety monitoring module 214 implements the automated confidential route monitoring with traveler-configured traveler safety alerts of the core processing module 200.

It should also be noted that the secure travel safety monitoring module 214 may form a portion of other circuitry described without departure from the scope of the present subject matter. Further, the secure travel safety monitoring module 214 may alternatively be implemented as an application stored within the memory 210. In such an implementation, the secure travel safety monitoring module 214 may include instructions executed by the CPU 202 for performing the functionality described herein. The CPU 202 may execute these instructions to provide the processing capabilities described above and in more detail below for the core processing module 200. The secure travel safety monitoring module 214 may form a portion of an interrupt service routine (ISR), a portion of an operating system, a portion of a browser application, or a portion of a separate application without departure from the scope of the present subject matter.

A timer/clock module 216 is illustrated and may be used to determine timing and date information, such as travel start, end, deviation, and detour times, as described above and in more detail below. As such, the secure travel safety monitoring module 214 may utilize information derived from the timer/clock module 216 for information processing activities, such as the secure travel safety monitoring and traveler safety alerts described herein.

A global positioning system (GPS) module 218 provides location coordinates usable for identifying a location of the traveler computing device 102 at any particular time. Location identification information generated by the GPS module 218 may be used by the secure travel safety monitoring module 214 to monitor traveler safety.

The CPU 202, the display 204, the input device 206, the communication module 208, the memory 210, the secure travel safety monitoring module 214, the timer/clock module 216, and the GPS module 218 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many possible arrangements for components of the core processing module 200 are possible and all are considered within the scope of the present subject matter. Accordingly, the core processing module 200 may take many forms and may be associated with many platforms.

Figure 3:
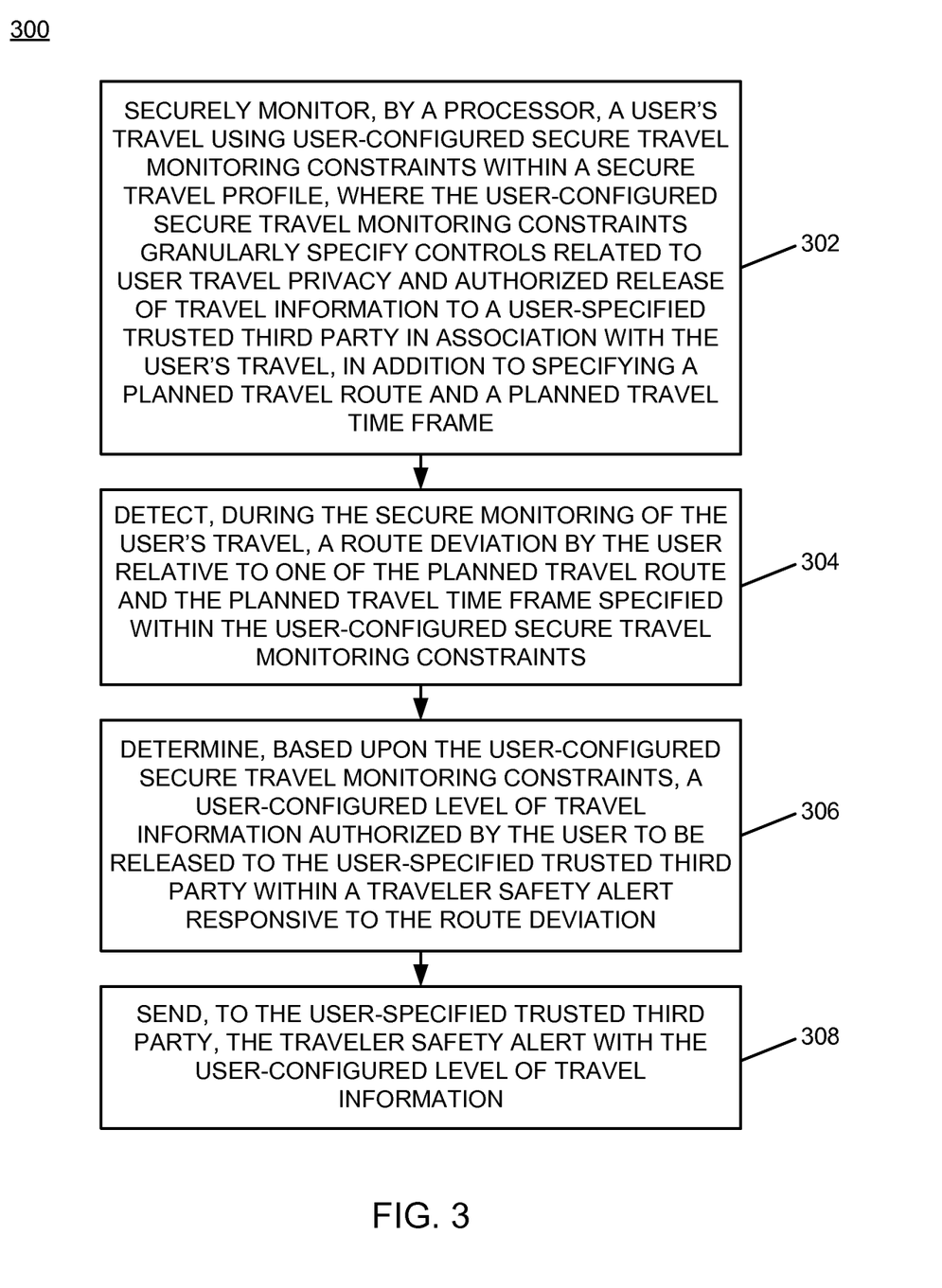
FIG. 3 is a flow chart of an example of an implementation of a process for confidential route monitoring with traveler-configured traveler safety alerts according to an embodiment of the present subject matter.
Figure 4:
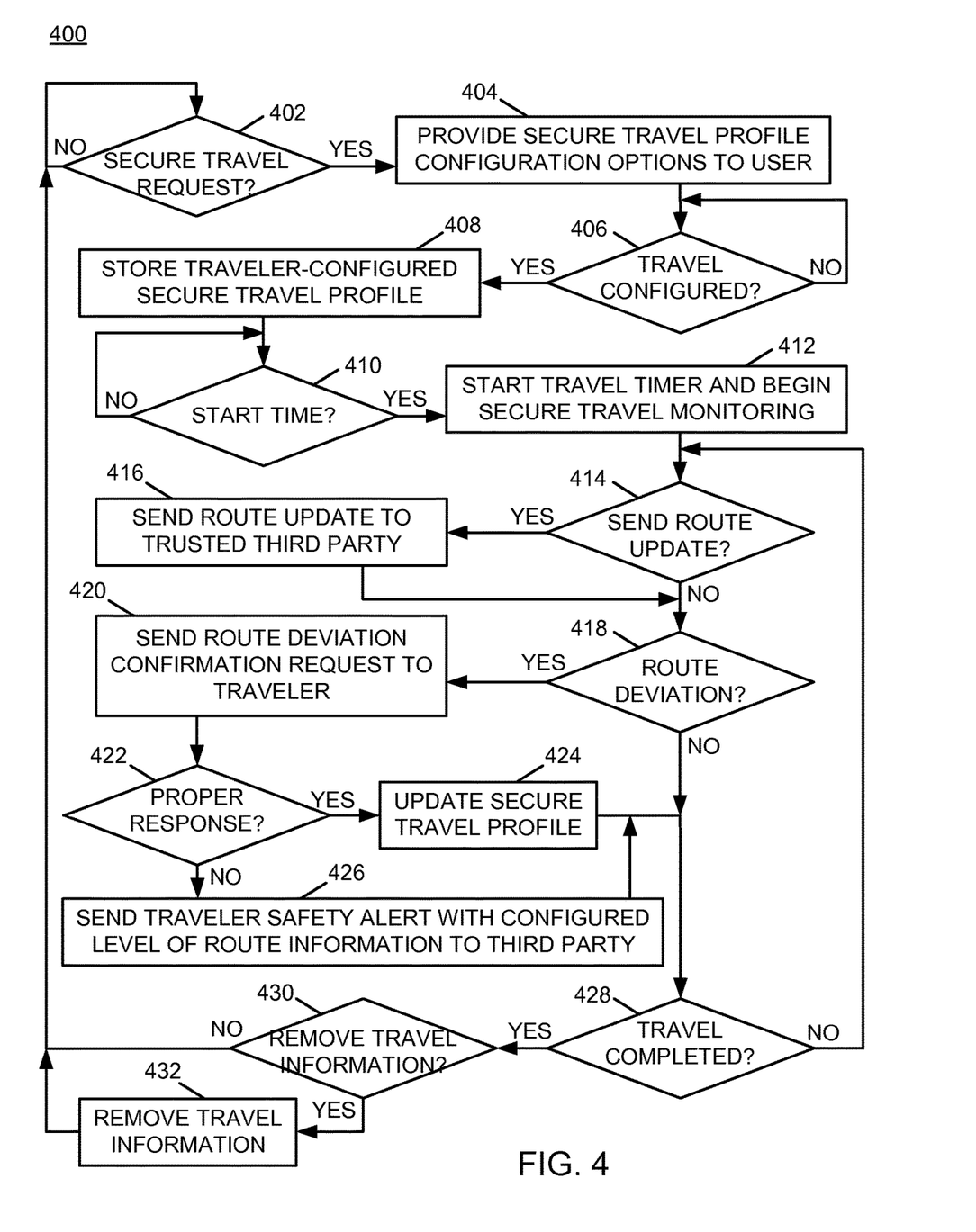
FIG. 4 is a flow chart of an example of an implementation of a process for confidential route monitoring with traveler-configured traveler safety alerts that includes additional processing for configuration and removal of user travel information according to an embodiment of the present subject matter.

FIG. 3 through FIG. 4 described below represent example processes that may be executed by devices, such as the core processing module 200, to perform the automated confidential route monitoring with traveler-configured traveler safety alerts associated with the present subject matter. Many other variations on the example processes are possible and all are considered within the scope of the present subject matter. The example processes may be performed by modules, such as the secure travel safety monitoring module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for confidential route monitoring with traveler-configured traveler safety alerts. At block 302, the process 300 securely monitors, by a processor, a user's travel using user-configured secure travel monitoring constraints within a secure travel profile, where the user-configured secure travel monitoring constraints granularly specify controls related to user travel privacy and authorized release of travel information to a user-specified trusted third party in association with the user's travel, in addition to specifying a planned travel route and a planned travel time frame. At block 304, the process 300 detects, during the secure monitoring of the user's travel, a route deviation by the user relative to one of the planned travel route and the planned travel time frame specified within the user-configured secure travel monitoring constraints. At block 306, the process 300 determines, based upon the user-configured secure travel monitoring constraints, a user-configured level of travel information authorized by the user to be released to the user-specified trusted third party within a traveler safety alert responsive to the route deviation. At block 308, the process 300 sends, to the user-specified trusted third party, the traveler safety alert with the user-configured level of travel information.

FIG. 4 is a flow chart of an example of an implementation of a process 400 for confidential route monitoring with traveler-configured traveler safety alerts that includes additional processing for configuration and removal of user travel information. At decision point 402, the process 400 makes a determination as to whether a secure travel monitoring request from a user/traveler has been detected, such as by entry of a travel planning request on the traveler computing device 102. The secure travel monitoring request may also include a request for a route recommendation, the user may enter a current location and destination with a planned travel route, as appropriate for a given implementation, or the secure travel monitoring request may be initiated without travel options. At block 404, the process 400 provides secure travel profile configuration options to the user that allow the user to specify secure travel monitoring and notification constraints. The secure travel profile configuration options may include a route recommendation based upon starting and ending locations specified by the user, usable to configure a secure travel profile for the traveler. Example secure travel profile configuration options may include a destination address, an origin address, an estimated start time (so that deviations in a start time may be detected), an estimated end time (so deviations in an end time may be detected), and trusted third party contact information (e.g., a phone number). The secure travel profile configuration options may also include alert information content and granularity, such as whether to provide travel route information to the trusted third party either prior to or during travel, whether to provide travel route information only in association with a traveler safety alert, or whether not to provide travel route information at all. The secure travel profile configuration options may also include whether or not to provide travel route updates to the trusted third party, or whether to just provide traveler safety alerts of route deviations from the configured travel path or time. The secure travel profile configuration options may also specify automated removal of travel route and route monitoring information, as well as the secure travel profile itself when travel is completed. The secure travel profile configuration options may also include a password or other configured identifier to allow the traveler to confirm that the traveler is safe if a route deviation is detected during travel. Other configuration options may be included in the secure travel profile as appropriate for a given implementation It should be noted that the travel route recommendation may be provided by the process 400, even where the user has entered a planned route, to recommend a more secure route than one entered by the user (e.g., to recommend travel along a more well-lighted path than a route entered by the user). The user may consider changing the planned route based upon any recommended route.

At decision point 406, the process 400 makes a determination as to whether all travel options have been configured by the user (e.g., start time, end time, route confirmation, any planned detours, etc.). In response to determining that all travel options have been configured by the user, the process 400 stores the traveler-configured secure travel profile at block 408.

At decision point 410, the process 400 makes a determination as to whether a configured start time of the travel has occurred, such as by use of the timer/clock module 216. In response to determining that the configured start time of the travel has occurred, the process 400 starts a travel timer and begins secure travel monitoring of the user's travel at block 412, such as by use of the timer/clock module 216 and the GPS module 218 of the traveler computing device 102, respectively.

At decision point 414, the process 400 begins a higher-level iterative loop of secure travel monitoring, and makes a determination as to whether the traveler has configured the secure travel profile to allow sending a route update to the trusted third party. The higher-level iterative processing will be apparent from the description below. In response to determining that the user has configured the secure travel profile to allow sending a route update to the trusted third party at decision point 414, the process 400 sends a route update to the trusted third party at block 416.

In response to sending the route update to the trusted third party at block 416, or in response to determining at decision point 414 that the traveler has not configured the secure travel profile to allow sending a route update to the trusted third party, the process 400 makes a determination at decision point 418 as to whether a route deviation (e.g., time or path) has been detected based upon the planned travel time and travel route. In response to determining that a route deviation has been detected based upon the planned travel time and travel path, the process 400 sends a route deviation confirmation request to the traveler requesting the traveler to confirm that the route deviation is planned at block 420. It should be noted that the traveler's response may include a user-configured safe response indicator, a password, or other configured safety identifier to allow the traveler to confirm that the traveler is safe. As such, at decision point 422, the process 400 makes a determination as to whether the traveler has provided a proper response to the route deviation confirmation request, such as by verification that a received indication from the user matches the user-configured safe response indicator, password, or other configured safety identifier.

In response to determining the traveler has provided a proper response to the route deviation confirmation request, the process 400 updates the travel profile at block 424. Updating of the secure travel profile in real time may further assist with traveler security or may further assist the trusted third party in the event of a subsequent unplanned route deviation, and an improper response received from the traveler. Alternatively, in response to determining at decision point 422 that the traveler has not provided a proper response to the route deviation confirmation request, the process 400 sends a traveler safety alert with the configured/limited level of route information specified within the secure travel profile to the trusted third party at block 426.

In response to updating the secure travel profile at block 424, or sending the traveler safety alert with the configured level of route information to the trusted third party at block 426, or in response to determining that a route deviation has not been detected based upon the planned travel time and travel route at decision point 418, the process 400 makes a determination at decision point 428 as to whether travel has been completed. In response to determining that travel has not been completed, the process 400 returns to decision point 414 and iterates as described above to continue with the higher-level iteration within the process 400

In response to determining that travel has been completed at decision point 428, the process 400 makes a determination at decision point 430, based upon the traveler-configured secure travel profile or a user request, as to whether to remove travel information, including the traveler-configured secure travel profile and the related secure travel monitoring information collected during the secure monitoring of the user's travel. In response to determining to remove the travel information, the process 400 removes the travel information from memory/storage at block 432. In response to removing the travel information from memory/storage at block 432, or in response to determining not to remove the travel information based upon the traveler-configured secure travel profile at decision point 430, the process 400 returns to decision point 402 and iterates as described above.

As such, the process 400 allows a user/traveler to configure a secure travel profile, including travel information, one or more trusted third parties to contact in the event of an unexplained detected route deviation in travel, and a granular set of information that may be relayed to the trusted third party/parties within a traveler safety alert. The process 400 operates to securely monitor the user's travel, and only provides the traveler-configured level of information within the traveler safety alert. The process 400 may further remove the travel-related information, including the traveler-configured secure travel profile and the related secure travel monitoring information, each as specified by the user within the traveler-configured secure travel profile.

As described above in association with FIG. 1 through FIG. 4, the example systems and processes provide confidential route monitoring with traveler-configured traveler safety alerts. Many other variations and additional activities associated with confidential route monitoring with traveler-configured traveler safety alerts are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
    confidentially monitoring, by a processor as part of user-controlled private travel security, a user's travel using user-configured travel monitoring constraints specified by the user within a user confidential-travel profile that independently control release of confidential user travel information comprising (i) a first user-configured travel monitoring constraint specified by the user to either authorize or prohibit release of a user-selected confidential travel route and (ii) a second user-configured travel monitoring constraint specified by the user to either authorize or prohibit release of a user-selected confidential travel time frame; and
    sending, in response to a detected route deviation by the user beyond a user-configured path-deviation threshold, a traveler alert comprising a user-authorized set of the confidential user travel information for which release is not prohibited by the user according to the user-configured travel monitoring constraints within the user confidential-travel profile to a trusted third party specified by the user within the user confidential-travel profile to receive the user-authorized set of the confidential user travel information within traveler alerts.

2. The method of claim 1, further comprising sending a route update during the user's travel to the user-specified trusted third party responsive to determining that the user-configured travel monitoring constraints authorize sending of route updates to the user-specified trusted third party during the user's travel.

3. The method of claim 1, further comprising:
    providing, responsive to a confidential travel request from the user, confidentiality-based travel profile configuration options that allow the user to specify the confidential user travel information, the user-configured travel monitoring constraints that independently control release of individual items of the confidential user travel information in response to detected route deviations, and the user-specified trusted third party; and configuring the user confidential-travel profile based upon user selections of the confidentiality-based travel profile configuration options.

4. The method of claim 1, where sending, in response to the detected route deviation by the user beyond the user-configured path-deviation threshold, the traveler alert comprises sending the traveler alert responsive to an improper response from the user to a route deviation confirmation request sent to the user requesting the user to confirm that the detected route deviation is safe.

5. The method of claim 1, further comprising:
sending a route deviation confirmation request to the user responsive to detecting the route deviation;
receiving a response to the route deviation confirmation request from the user;
determining, based upon a user-configured safe response indicator configured by the user within the user confidential-travel profile, whether the response to the route deviation confirmation request received from the user is valid; and
updating one of the user-selected confidential travel route and the user-selected confidential travel time frame of the confidential user travel information within the user confidential-travel profile responsive to determining the response to the route deviation confirmation request received from the user is valid.

6. The method of claim 5, where sending, in response to the detected route deviation by the user beyond the user-configured path-deviation threshold, the traveler alert comprises sending the traveler alert responsive to determining that the response to the route deviation confirmation request received from the user is invalid relative to the user-configured safe response indicator configured by the user within the user confidential-travel profile.

7. The method of claim 1, further comprising:
determining whether the user has specified within the user confidential-travel profile, as a confidential travel option, removal from memory of the user confidential-travel profile and confidential travel monitoring information collected during the confidential monitoring of the user's travel upon completion of the user's travel; and
removing the user confidential-travel profile and the confidential travel monitoring information collected during the confidential monitoring of the user's travel in response to determining that the user has specified within the user confidential-travel profile, as the confidential travel option, removal from the memory of the user confidential-travel profile and the confidential travel monitoring information collected during the confidential monitoring of the user's travel upon completion of the user's travel.

8. A system, comprising:
a memory; and
a processor programmed to:
confidentially monitor, as part of user-controlled private travel security, a user's travel using user-configured travel monitoring constraints specified by the user within a user confidential-travel profile stored within the memory that independently control release of confidential user travel information comprising (i) a first user-configured travel monitoring constraint specified by the user to either authorize or prohibit release of a user-selected confidential travel route and (ii) a second user-configured travel monitoring constraint specified by the user to either authorize or prohibit release of a user-selected confidential travel time frame; and
send, in response to a detected route deviation by the user beyond a user-configured path-deviation threshold, a traveler alert comprising user-authorized set of the confidential user travel information for which release is not prohibited by the user according to the user-configured travel monitoring constraints within the user confidential-travel profile to a trusted third party specified by the user within the user confidential-travel profile to receive the user-authorized set of the confidential user travel information within traveler alerts.

9. The system of claim 8, where the processor is further programmed to send a route update during the user's travel to the user-specified trusted third party responsive to determining that the user-configured travel monitoring constraints authorize sending of route updates to the user-specified trusted third party during the user's travel.

10. The system of claim 8, where, in being programmed to send, in response to the detected route deviation by the user beyond the user-configured path-deviation threshold, the traveler alert, the processor is programmed to send the traveler alert responsive to an improper response from the user to a route deviation confirmation request sent to the user requesting the user to confirm that the detected route deviation is safe.

11. The system of claim 8, where the processor is further programmed to:
send a route deviation confirmation request to the user responsive to detecting the route deviation;
receive a response to the route deviation confirmation request from the user;
determine, based upon a user-configured safe response indicator configured by the user within the user confidential-travel profile, whether the response to the route deviation confirmation request received from the user is valid; and
update one of the user-selected confidential travel route and the user-selected confidential travel time frame of the confidential user travel information within the user confidential-travel profile responsive to determining the response to the route deviation confirmation request received from the user is valid.

12. The system of claim 11, where, in being programmed to send, in response to the detected route deviation by the user beyond the user-configured path-deviation threshold, the traveler alert, the processor is programmed to send the traveler alert responsive to determining that the response to the route deviation confirmation request received from the user is invalid relative to the user-configured safe response indicator configured by the user within the user confidential-travel profile.

13. The system of claim 8, where the processor is further programmed to:
determine whether the user has specified within the user confidential-travel profile, as a confidential travel option, removal from the memory of the user confidential-travel profile and confidential travel monitoring information collected during the confidential monitoring of the user's travel upon completion of the user's travel; and
remove the user confidential-travel profile and the confidential travel monitoring information collected during the confidential monitoring of the user's travel in response to determining that the user has specified within the user confidential-travel profile, as the confidential travel option, removal from the memory of the user confidential-travel profile and the confidential travel monitoring information collected during the confidential monitoring of the user's travel upon completion of the user's travel.

14. A computer program product, comprising:
a computer readable storage medium having computer readable program code embodied therewith, where the computer readable program code when executed on a computer causes the computer to:
confidentially monitor, as part of user-controlled private travel security, a user's travel using user-configured travel monitoring constraints specified by the user within a user confidential-travel profile that independently control release of confidential user travel information comprising (i) a first user-configured travel monitoring constraint specified by the user to either authorize or prohibit release of a user-selected confidential travel route and (ii) a second user-configured travel monitoring constraint specified by the user to either authorize or prohibit release of a user-selected confidential travel time frame; and
send, in response to a detected route deviation by the user beyond a user-configured path-deviation threshold, a traveler alert comprising a user-authorized set of the confidential user travel information for which release is not prohibited by the user according to the user-configured travel monitoring constraints within the user confidential-travel profile to a trusted third party specified by the user within the user confidential-travel profile to receive the user-authorized set of the confidential user travel information within traveler alerts.

15. The computer program product of claim 14, where the computer readable program code when executed on the computer further causes the computer to send a route update during the user's travel to the user-specified trusted third party responsive to determining that the user-configured travel monitoring constraints authorize sending of route updates to the user-specified trusted third party during the user's travel.

16. The computer program product of claim 14, where the computer readable program code when executed on the computer further causes the computer to:
provide, responsive to a confidential travel request from the user, confidentiality-based travel profile configuration options that allow the user to specify the confidential user travel information, the user-configured travel monitoring constraints that independently control release of individual items of the confidential user travel information in response to detected route deviations, and the user-specified trusted third party; and
configure the user confidential-travel profile based upon user selections of the confidentiality-based travel profile configuration options.

17. The computer program product of claim 14, where, in causing the computer to send, in response to the detected route deviation by the user beyond the user-configured path-deviation threshold, the traveler alert, the computer readable program code when executed on the computer causes the computer to send the traveler alert responsive to an improper response from the user to a route deviation confirmation request sent to the user requesting the user to confirm that the detected route deviation is safe.

18. The computer program product of claim 14, where the computer readable program code when executed on the computer further causes the computer to:
send a route deviation confirmation request to the user responsive to detecting the route deviation;
receive a response to the route deviation confirmation request from the user;
determine, based upon a user-configured safe response indicator configured by the user within the user confidential-travel profile, whether the response to the route deviation confirmation request received from the user is valid; and
update one of the user-selected confidential travel route and the user-selected confidential travel time frame of the confidential user travel information within the user confidential-travel profile responsive to determining the response to the route deviation confirmation request received from the user is valid.

19. The computer program product of claim 18, where, in causing the computer to send, in response to the detected route deviation by the user beyond the user-configured path-deviation threshold, the traveler alert, the computer readable program code when executed on the computer causes the computer to send the traveler alert responsive to determining that the response to the route deviation confirmation request received from the user is invalid relative to the user-configured safe response indicator configured by the user within the user confidential-travel profile.

20. The computer program product of claim 14, where the computer readable program code when executed on the computer further causes the computer to:
determine whether the user has specified within the user confidential-travel profile, as a confidential travel option, removal from memory of the user confidential-travel profile and confidential travel monitoring information collected during the confidential monitoring of the user's travel upon completion of the user's travel; and
remove the user confidential-travel profile and the confidential travel monitoring information collected during the confidential monitoring of the user's travel in response to determining that the user has specified within the user confidential-travel profile, as the confidential travel option, removal from the memory of the user confidential-travel profile and the confidential travel monitoring information collected during the confidential monitoring of the user's travel upon completion of the user's travel.

* * * * *